Figure 1:
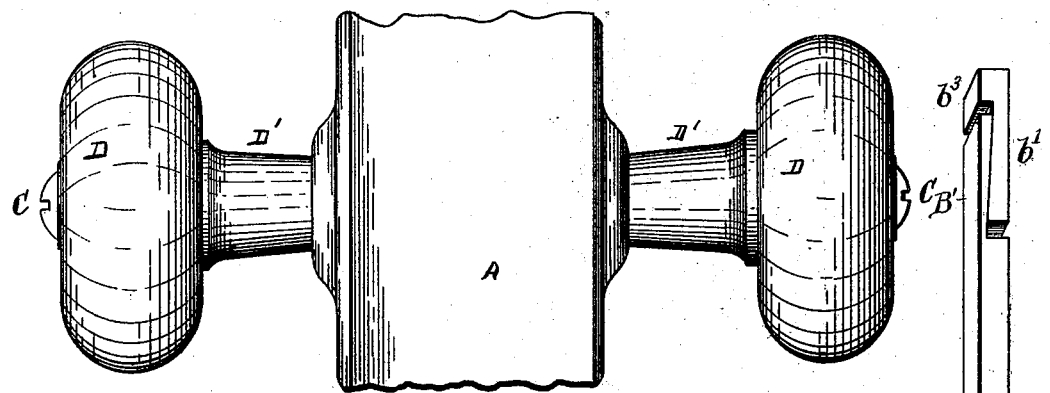

(No Model.)

D. CLARK.
KNOB ATTACHMENT.

No. 506,388. Patented Oct. 10, 1893.

Witnesses
C. B. Barnziger.
John F. Miller

Inventor
Dexter Clark
By his Attorney
Newell S. Wright

UNITED STATES PATENT OFFICE.

DEXTER CLARK, OF MILFORD, MICHIGAN.

KNOB ATTACHMENT.

SPECIFICATION forming part of Letters Patent No. 506,388, dated October 10, 1893.

Application filed March 18, 1893. Serial No. 466,637. (No model.)

*To all whom it may concern:*

Be it known that I, DEXTER CLARK, a citizen of the United States, residing at Milford, county of Oakland, State of Michigan, have invented a certain new and useful Improvement in Door-Knob Attachments; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a spindle and a door knob attachment thereto, as hereinafter specified and claimed, and illustrated in the drawings, in which—

Figures 2, 3:
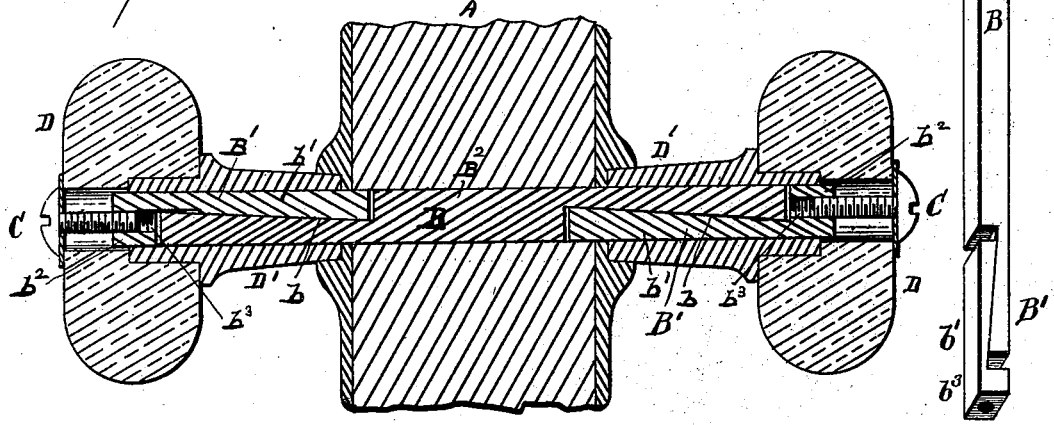

Figure 1 is a view in elevation. Fig. 2 is a view in longitudinal section embodying my invention. Fig. 3 is a separate view of the spindle body and spindle arms forming the completed spindle.

The object of my invention is to provide a spindle and knob attachment thereto whereby the knob will be firmly held in place, without liability of slipping off, and whereby also it will be readily adjusted into position upon the spindle and against the ordinary rose, in a superior and most efficient manner.

I carry out my invention as follows:

A represents the door in which the spindle is engaged.

My improved spindle is constructed with a body portion B, the intermediate part of which is made solid and of rectangular form, square in cross section, as indicated at $B^2$. One or both extremities of the spindle are cut away to form a wedge shaped face, as shown at "$b$" forming corresponding recesses, extending longitudinally at the extremities of the spindle. These cut away ends are extended into the adjacent shank D' of the knob D, and are shown at B'. Into said longitudinal recesses formed by cutting away the ends of the spindle I locate correspondingly shaped spindle arms "$b'$," having a wedge shaped face adjacent to the wedge shaped face of the parts B' of the spindle, the wedge shaped face of the one being the counterpart of the other, the arms "$b'$" wedging against the part B' as said arms are drawn outward, and vice versa. This is accomplished by making the respective recesses deepest at their inner ends and the arms "$b'$" thinnest at their outer ends. The arms "$b$" are each provided with a flanged head "$b^3$" at the outer end extending over the end of the arms B' and having a screw threaded orifice therein to receive a screw C, by which the knob is engaged thereupon. The spindle, thus, as a completed article is constructed in three parts, the body B with its cut away ends B' and the two wedge shaped arms "$b'$," "$b'$" fitted into the cut away portions of the spindle, and extending over the outer ends of the body portion. When the screws C are inserted, only a very slight movement of the arms "$b'$" is required to tighten the spindle as a whole in the shank. The shank is thus drawn down firmly against the adjacent rose, and is held from any possibility of being pulled off until the screw is removed. The arms "$b'$" having a longitudinal sliding and wedging engagement with the extremities of the body of the spindle, is a most important feature. The inner faces of the shank are formed on straight planes, the socket therein being square in cross section. By this construction and arrangement I am enabled to use any ordinary knob, a specially constructed knob not being required. In this manner parallel inner faces within the shank bear against similar faces upon the ends of the body portion of the spindle, and arms "$b'$." The shanks of the knobs readily adjust themselves to proper position as the screws are driven home, the arms "$b'$" moving in or out as may be required to effect the desired adjustment of the parts, the shanks engaging over both the adjacent extremity of the body of the spindle and the outer end of the adjacent movable arm "$b'$."

What I claim as my invention is—

1. A door knob spindle constructed in three parts consisting of a body portion B cut away or recessed longitudinally at its extremities, and of movable spindle arms "$b'$," "$b'$" located in the cut away portions of said extremities respectively and formed with heads extending over the end faces of the body of the spindle, and in combination therewith knobs and their shanks embracing the adjacent ends of the spindle body and spindle arms respectively, and screws C engaging the knobs with the heads of the spindle arms, said shanks being straight faced interiorly adjacent to the spindle body and arm, the adjacent faces of the spindle body and spindle arms being wedge shaped to prevent the shanks from being pulled off therefrom, substantially as described.

2. A door knob spindle constructed in three parts consisting of a body portion B, square in cross section intermediate its ends and cut away or recessed longitudinally at its extremities, and of movable spindle arms "$b'$," "$b'$" located in the cut away portions of said extremities respectively, normally forming with the ends of said body a square in cross section, and provided with heads extending over the end faces of the body of the spindle, and in combination therewith knobs and their shanks embracing the adjacent ends of the spindle body and spindle arms respectively, and screws C engaging the knobs with the heads of the spindle arms, said shanks being straight faced interiorly adjacent to the spindle body and arm, the adjacent faces of the spindle body and spindle arms being wedge shaped to prevent the shanks from being pulled off therefrom, the opposite exterior faces of said body portion and spindle arms being on parallel planes, substantially as described.

In testimony whereof I sign this specification in the presence of two witnesses.

DEXTER CLARK.

Witnesses:
N. S. WRIGHT,
JOHN F. MILLER.